(12) United States Patent
Nammi et al.

(10) Patent No.: US 10,708,112 B2
(45) Date of Patent: Jul. 7, 2020

(54) DYNAMIC INDICATION OF HIGHER ORDER MODULATION AND CODING SCHEME TABLE

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/869,699

(22) Filed: Jan. 12, 2018

(65) Prior Publication Data
US 2019/0222462 A1 Jul. 18, 2019

(51) Int. Cl.
*H04L 27/34* (2006.01)
*H04L 1/00* (2006.01)
(Continued)

(52) U.S. Cl.
CPC ........ *H04L 27/3488* (2013.01); *H04L 1/0003* (2013.01); *H04L 1/0016* (2013.01); *H04L 1/0022* (2013.01); *H04L 1/0025* (2013.01); *H04L 1/0026* (2013.01); *H04L 1/0035* (2013.01); *H04B 7/0413* (2013.01); *H04B 7/0632* (2013.01)

(58) Field of Classification Search
CPC ... H04L 1/0005; H04L 1/0003; H04L 1/0009; H04L 27/02
See application file for complete search history.

(56) References Cited

U.S. PATENT DOCUMENTS

| 7,613,244 B2 | 11/2009 | Hwang et al. |
| 8,509,168 B2 * | 8/2013 | Kim ............... H04L 1/0026 370/329 |

(Continued)

FOREIGN PATENT DOCUMENTS

| CA | 2931649 A1 | 7/2015 |
| CN | 101388744 A | 5/2012 |

(Continued)

OTHER PUBLICATIONS

Duplicy, et al. "MU-MIMO in LTE Systems," EURASIP Journal on Wireless Communications and Networking 2011.1 (2011): 496763., https://link.springer.com/content/pdf/10.1155%2F2011%2F496763. pdf, Received Dec. 1, 2010, 13 pages.

(Continued)

*Primary Examiner* — Janice N Tieu
(74) *Attorney, Agent, or Firm* — Amin, Turocy & Watson, LLP

(57) ABSTRACT

The described technology is generally directed towards dynamically changing which quadrature amplitude modulation (QAM) table a user equipment is to use based on channel quality information. A network schedules a user equipment with 256 QAM modulation if the user equipment recommends 256 QAM in the CQI report (and the scheduler decides to use 256 QAM for that particular user equipment). The network indicates to the user equipment that it has to use 256 QAM modulation and coding scheme (MCS) table and not the configured QAM MCS table while determining the scheduling parameters by decoding PDCCH.

20 Claims, 13 Drawing Sheets

(51) Int. Cl.
  *H04B 7/0413* (2017.01)
  *H04B 7/06* (2006.01)

(56) References Cited

U.S. PATENT DOCUMENTS

| | | | |
|---|---|---|---|
| 9,479,287 | B2 | 10/2016 | Yang et al. |
| 9,509,440 | B2* | 11/2016 | Hammarwall ........ H04L 1/0003 |
| 9,642,118 | B2 | 5/2017 | Lahetkangas et al. |
| 9,774,418 | B2 | 9/2017 | Meng et al. |
| 9,871,618 | B2 | 1/2018 | Yang et al. |
| 2008/0214213 | A1* | 9/2008 | Etemad ................ H04W 12/02 455/456.6 |
| 2014/0301306 | A1* | 10/2014 | Kim ..................... H04L 5/0046 370/329 |
| 2014/0313985 | A1* | 10/2014 | Nimbalker .......... H04L 27/0012 370/329 |
| 2015/0327225 | A1* | 11/2015 | Xia ....................... H04W 28/06 370/329 |
| 2016/0036618 | A1* | 2/2016 | Einhaus ............... H04L 1/0003 370/329 |
| 2016/0087752 | A1 | 3/2016 | Xia et al. |
| 2016/0094310 | A1 | 3/2016 | Xia |
| 2016/0219600 | A1 | 7/2016 | Li et al. |
| 2017/0171014 | A1 | 6/2017 | Chen et al. |
| 2017/0208568 | A1 | 7/2017 | Nam et al. |
| 2018/0205511 | A1* | 7/2018 | Li ........................ H04L 1/0009 |

FOREIGN PATENT DOCUMENTS

| | | |
|---|---|---|
| CN | 102624481 A | 8/2012 |
| CN | 101674149 A | 11/2012 |
| CN | 101630991 A | 1/2013 |
| CN | 102377508 A | 6/2015 |
| EP | 2228933 A1 | 9/2010 |
| EP | 3 089 508 A1 | 11/2016 |
| WO | 2013/123961 A1 | 8/2013 |
| WO | 2015/020587 A1 | 2/2015 |
| WO | 2015/030669 A1 | 3/2015 |
| WO | 2015/103588 A1 | 7/2015 |
| WO | 2015100690 A1 | 7/2015 |
| WO | 2016164074 A1 | 10/2016 |

OTHER PUBLICATIONS

Elnashar, et al., "Looking at LTE in practice: A performance analysis of the LTE system based on field test results," IEEE Vehicular Technology Magazine 8.3 (2013): 81-92., https://www.researchgate.net/profile/Ayman_Elnashar/publication/260654677_Looking_at_LTE_in_Practice_A_Performance_Analysis_of_the_LTE_System_Based_on_Field_Test_Results /links/56b0ad0008ae9ea7c3b1e552.pdf, 13 pages.

5GNow, "Consistent 5G Radio Access Architecture Concepts," Forschung EV HHI, and Alternatives CEA France, Germany, 5GNow, Ver.1.0, 2015., http://www.5gnow.eu/wp-content/uploads/2015/04/5GNOW_D2.3_final1.pdf, 61 pages.

Chen, et al, "Impact of rank optimization on downlink non-orthogonal multiple access (NOMA) with SUMIMO," Communication Systems (ICCS), 2014 IEEE International Conference on. IEEE, 2014., http://www.meetmatt-conf.net/iccs2014/checkpapers/1570016059.pdf, 5 pages.

International Search Report and Written Opinion received for PCT Application Serial No. PCT/US2018/065805 dated Mar. 18, 2019, 15 pages.

* cited by examiner

DYNAMIC INDICATION OF HIGHER ORDER MODULATION AND CODING SCHEME TABLE

TECHNICAL FIELD

The subject application is related to wireless communication systems, and, for example, to dynamically indicating a change to which modulation and coding scheme table to use in a wireless communication system.

BACKGROUND

In wireless communication systems, multiple input multiple output (MIMO), is an antenna technique configured to improve the spectral efficiency and thereby boost overall system capacity. The MIMO technique uses a commonly known notation (M×N) to represent MIMO configuration in terms number of transmit (M) and receive antennas (N) on one end of the transmission system. MIMO systems can significantly increase the data carrying capacity of wireless systems. MIMO can be used for achieving diversity gain, spatial multiplexing gain and beamforming gain.

In new radio, sometimes referred to as 5G, user equipment computes channel estimates based on pilot or reference signals from the 5G system, and computes the parameters needed for channel state information (CSI) reporting. A CSI report, including channel quality indicator (CQI) data, is sent from the user equipment to a network device on demand via a feedback channel on request from the network, and/or the user equipment may be configured to send the CSI report periodically. A network scheduler uses this information in choosing the parameters for scheduling of this particular user equipment. The network sends the scheduling parameters to the user equipment in a downlink control channel. After that, actual data transfer takes place from the network to the user equipment.

In new radio, for channel quality indicator (CQI) modulation schemes, the network can configure a user equipment to use a CQI table having a up to a 64 quadrature amplitude modulation (QAM) scheme or to use a CQI table having a up to a 256 QAM modulation scheme. For modulation and coding scheme (MCS) interpretation, the network somewhat similarly configures the user equipment to use a modulation and code rate table for the physical downlink shared channel (PDSCH) with a maximum modulation order of 64 QAM, or to use a different table with a maximum modulation order of 256 QAM. However, the CQI table configuration is indicated when the network configures the CSI reporting configuration, whereas the MCS table is configured when the user equipment is configured for PDSCH transmission in the connected state. As a result, there is a possibility of a mismatch between the configuration of the CQI table and the configuration of the MCS table. For example, if the user equipment is configured with 256-QAM table for CQI, while the MCS table is 64-QAM, the network can never schedule the user equipment with 256-QAM modulation, as the network cannot indicate the 256-QAM modulation. This implies that even though the user equipment is capable of receiving 256 QAM modulation and coding scheme, the network cannot schedule an MCS index with 256 QAM entries. This incurs loss in link throughput and system throughput for 5G systems.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
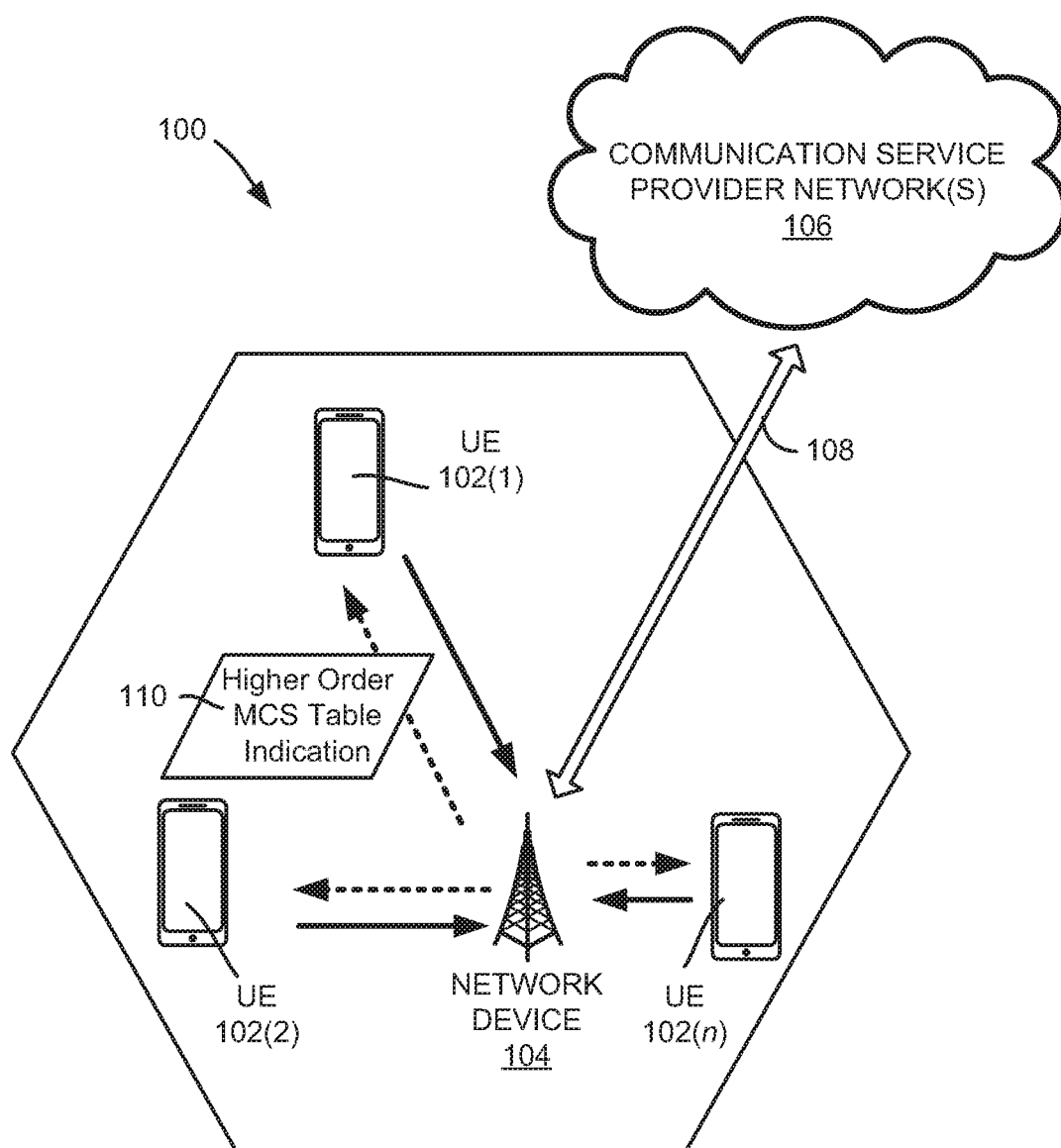
FIG. 1 illustrates an example wireless communication system in which a network node device (e.g., network node) and user equipment (UE) can implement various aspects and implementations of the subject disclosure.

Briefly, one or more aspects of the technology described herein are generally directed towards dynamically indicating when a user equipment is to use a higher order modulation and coding scheme (MCS) table, e.g., the 256 quadrature amplitude modulation (QAM) table, even if previously configured to use the 64 QAM table. This improves link and system performance for 5G wireless communication systems, in many scenarios.

In one aspect, the network device (generally the transmitter in this type of communication) obtains the channel quality indicator (CQI) data from the user equipment (generally the receiver). The network device schedules the user equipment with 256 QAM modulation if the user equipment recommends 256 QAM in the CQI report, and the scheduler decides to use 256 QAM for that particular user equipment. The network device indicates to the user equipment that the user equipment has to use the 256 QAM MCS table and not the configured 64 QAM MCS table while determining the scheduling parameters by decoding the physical dedicated control channel (PDCCH). Various non-limiting techniques for providing the higher order MCS table indication to the user equipment are exemplified herein, including via a separate flag, via unused bit combinations of otherwise existing downlink control information (DCI), indication via a separate DCI, or via implicit agreement between the network and the user equipment.

Operations for which the user equipment is responsible include reporting the channel state information (CSI) based on the configured CQI table from the CSI reporting configuration, and decoding the DCI to determine which MCS table to use for determining the MCS parameters. The user equipment can then decode the physical downlink shared channel (PDSCH) based on the derived parameters from the MCS table that was determined.

As is understood, the technology described herein facilitates increased network capacity due to higher order modulation schemes with sufficient granularity, and that the higher order modulation (e.g. 256 QAM) can be more efficiently used. This enhances overall user equipment and system throughput.

It should be understood that any of the examples and terms used herein are non-limiting. For instance, the examples are based on New Radio (NR, sometimes referred to as 5G) communications between a user equipment exemplified as a smartphone or the like and network device; however virtually any communications devices may benefit from the technology described herein, and/or their use in different spectrums may likewise benefit. Further, as used in the examples herein, "higher order" refers to a table that has a higher maximum modulation, typically exemplified as 256 QAM MCS table in place of a 64 QAM MCS table. Notwithstanding, these are non-limiting examples, and any table that allows for such an increase is contemplated, e.g., a future table may allow a maximum modulation of 512 QAM and so on. Thus, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception.

Note that the solutions outlined equally applies for Multi RAB (radio bearers) on some carriers (that is data plus speech is simultaneously scheduled).

FIG. 1 illustrates an example wireless communication system 100 in accordance with various aspects and embodiments of the subject technology. In one or more embodiments, the system 100 can comprise one or more user equipment UEs 102(1)-102(n).

In various embodiments, the system 100 is or comprises a wireless communication network serviced by one or more wireless communication network providers. In example embodiments, a UE 102 can be communicatively coupled to the wireless communication network via a network device 104 (e.g., network node). The network device 104 can communicate with the user equipment (UE) 102, thus providing connectivity between the UE and the wider cellular network.

In example implementations, each UE 102 such as the UE 102(1) is able to send and/or receive communication data via a wireless link to the network device 104. The dashed arrow lines from the network device 104 to the UE 102 represent downlink (DL) communications and the solid arrow lines from the UE 102 to the network devices 104 represents uplink (UL) communications.

The system 100 can further include one or more communication service provider networks 106 that facilitate providing wireless communication services to various user equipment, including UEs 102(1)-102(n), via the network device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., the UE 102 and the network device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

In FIG. 1, as described herein, a user equipment (e.g., 102(1)) is configured to receive a higher order MCS table indication 110, for use in selecting the appropriate MCS table for transmission, e.g., maximum 256 QAM even if previously configured with a table having a maximum 64 QAM. To this end, the user equipment transmits periodic or aperiodic CSI reports, and based in part on the CQI data therein, the network device 104 decides whether the user equipment is to use a higher order (e.g., 256 QAM) MCS table for transmission.

Figure 2:
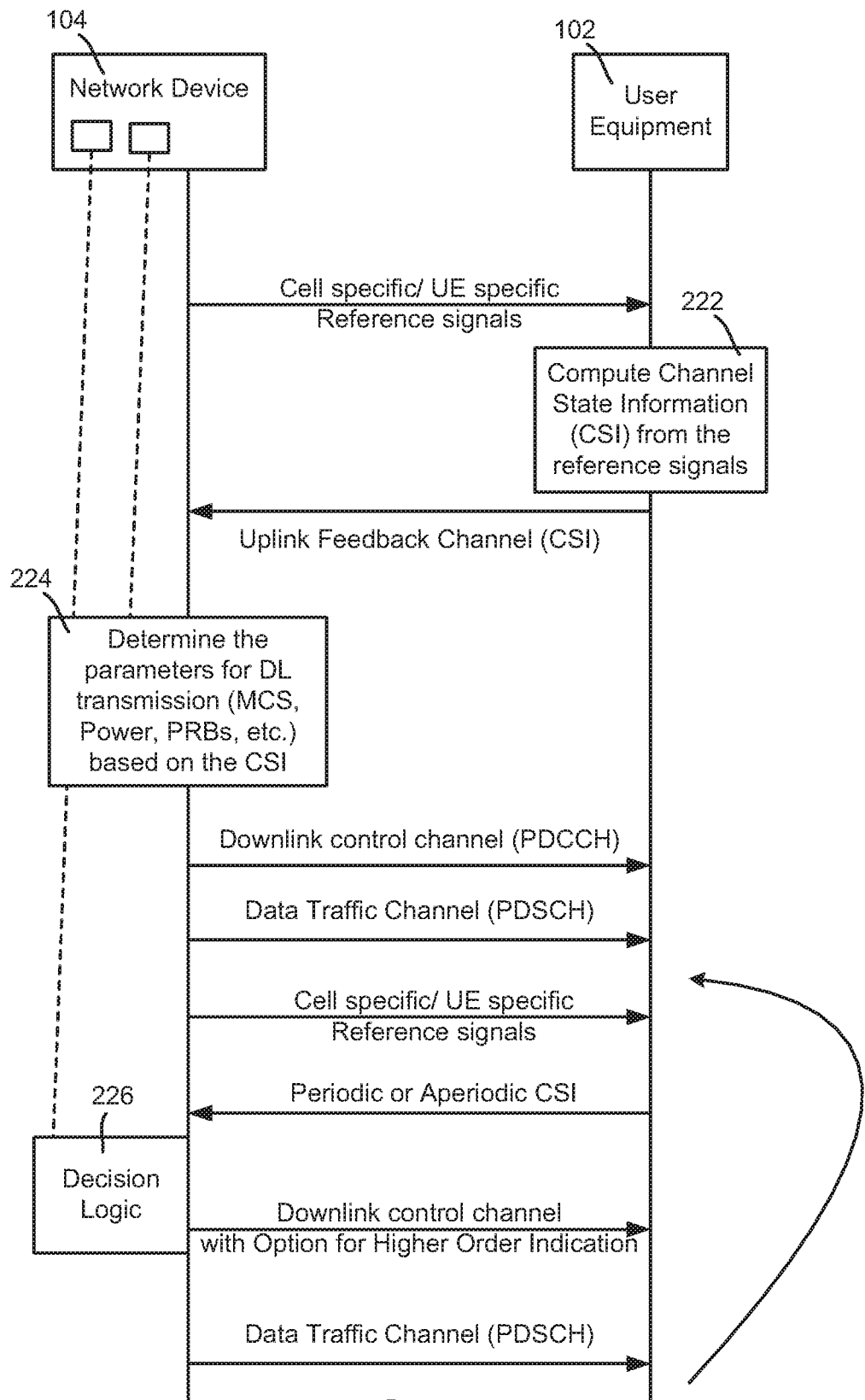
FIG. 2 illustrates an example message sequence including a message with the ability to provide an indication from the network device to a user equipment to use a higher order modulation and coding scheme table, in accordance with various aspects and implementations of the subject disclosure.

FIG. 2 initially shows a typical message sequence chart for downlink data transfer in 5G systems. From the pilot or reference signals provided by the network device 104, the UE 102 computes channel estimates (block 222) and computes the parameters needed for CSI reporting. The CSI report comprises, for example, channel quality indicator (CQI) data, precoding matrix index (PMI), rank information (RI) and so on.

As further represented in FIG. 2, the CSI report is sent to the network device 104 via an uplink feedback channel, either on a periodic basis or on an on-demand based CSI, that is, via aperiodic CSI reporting. The network device 104 scheduler (part of block 224) uses this information in choosing the parameters for scheduling of this particular UE. The network device 104 sends the scheduling parameters to the UE 102 in the PDCCH downlink control channel. After that, actual data transfer takes place (via PDSCH) from the network device 104 to the UE 102.

Downlink reference signals are predefined signals occupying specific resource elements within the downlink time-frequency grid. There are several types of downlink reference signals that are transmitted in different ways and used for different purposes by the receiving terminal. CSI reference signals (CSI-RS) are specifically intended to be used by terminals to acquire channel-state information (CSI) and beam specific information (beam RSRP). In 5G, CSI-RS is UE specific, so it can have a significantly lower time/frequency density. Demodulation reference signals (DM-RS, sometimes referred to as UE-specific reference signals), are specifically intended to be used by terminals for channel estimation for data channel. The label "UE-specific" relates to the fact that each demodulation reference signal is intended for channel estimation by a single terminal. That specific reference signal is then only transmitted within the resource blocks assigned for data traffic channel transmission to that terminal.

In 5G, the downlink control channel (PDCCH) carries information about the scheduling grants, which typically include the number of MIMO layers scheduled, transport block sizes, modulation for each codeword, parameters related to HARQ, and sub band locations. Note with DM-RS, there is no need to inform the selected precoding matrix thereby saving the number of bits in the downlink control channel.

In 5G, the uplink control channel carries information about HARQ-ACK information corresponding to the downlink data transmission, and channel state information. The channel state information typically includes RI, CQI, and PMI.

As mentioned, the network can configure the UE to send CSI either periodically or on demand basis. However, in general it is the common practice to configure the UE with both types of CSI reporting as this is beneficial for sub band scheduling. From the pilot or reference signals, the UE computes the channel estimates then computes the parameters needed for CSI reporting. In general the periodic CSI report includes CSI computed over the whole bandwidth and may not represent the sub band CSI. For this purposes the network can demand sub band CSI via a downlink control channel. In these cases, the UE reports the CSI aperiodically. Once the network gets this information, it can schedule the UE with either sub band scheduling or with wideband scheduling.

As a more particular example, as represented in FIG. 2, in general rather than using the pre-configured MCS table, pre-configured using higher layer (Radio Resource Control) signaling, the network can switch MCS tables dynamically based on the CQI received from the user equipment. For example, consider that the network configures a UE with 2 CSI report configurations, where the first report is periodic and wideband CQI is reported, and the other is an aperiodic CSI report configuration where sub band CQI is reported. In these cases, consider that the network configures the UE with the CQI table up to 64 QAM for the periodic CSI and the CQI table up to 256 QAM for the aperiodic case. Then consider that the network configures the UE to use the 64 QAM MCS table. Hence in the conventional scheme, the network can never schedule the UE with 256 QAM, even if the sub band CQI reported consists of 256 QAM.

Figure 3:
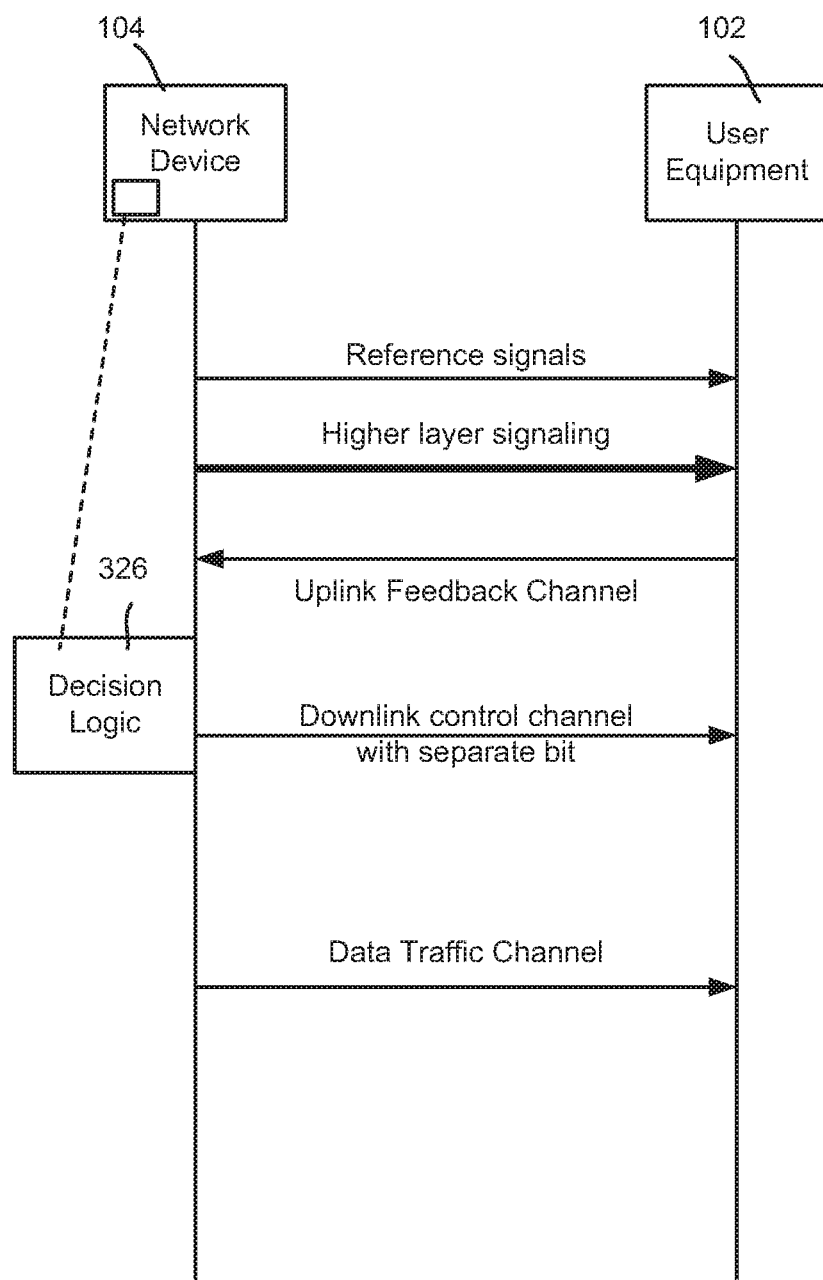
FIG. 3 illustrates an example message sequence including a message with the ability to provide an indication from the network device to a user equipment, via a flag, to use a higher order modulation and coding scheme table, in accordance with various aspects and implementations of the subject disclosure.
Figure 4:
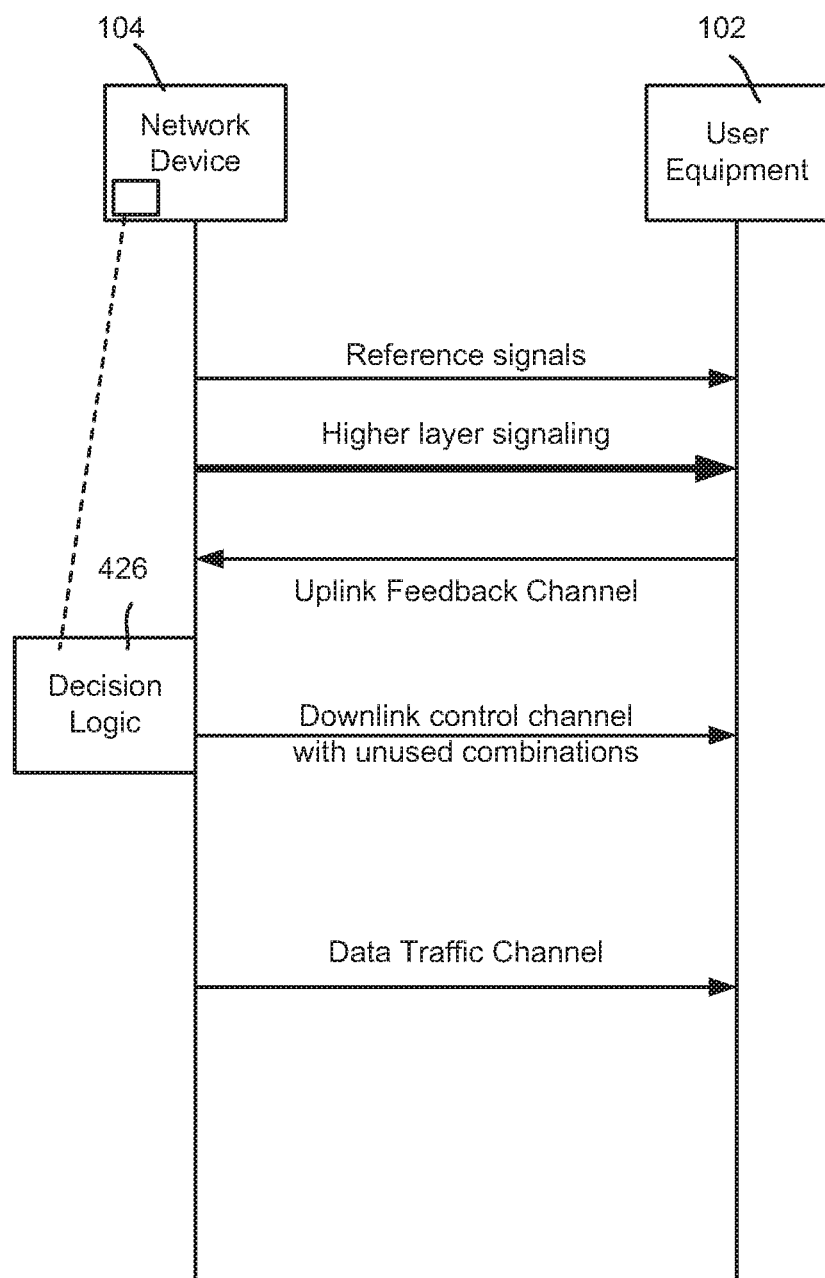
FIG. 4 illustrates an example message sequence including a message with the ability to provide an indication from the network device to a user equipment, via unused combinations of a field, to use a higher (or lower) order modulation and coding scheme table, in accordance with various aspects and implementations of the subject disclosure.
Figure 5:
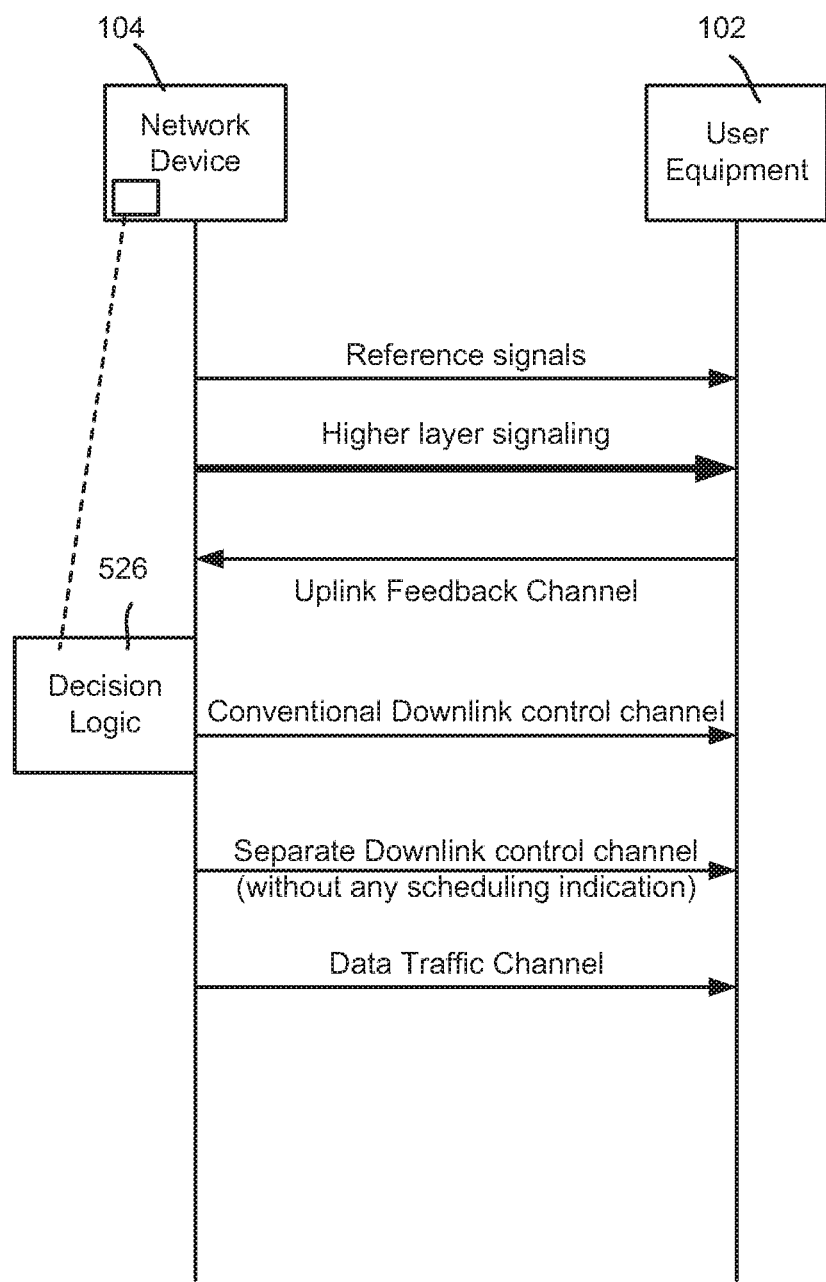
FIG. 5 illustrates an example message sequence including a message with the ability to provide an indication from the network device to a user equipment, via a separate downlink control channel, to use a higher (or lower) order modulation and coding scheme table, in accordance with various aspects and implementations of the subject disclosure.

As described herein, the network can switch to the 256 MCS table for that transmission if decision logic 226 of the network decides to use 256 QAM (based on the CQI it received) and indicate this change to the UE via different signaling schemes as explained herein with reference to FIGS. 3-5. This is represented in FIG. 2 via the arrow identified as downlink control channel with option for higher order indication. Data traffic (PDSCH) can then transmit with 256 QAM, e.g., until changed in response to another CSI report.

Turning to aspects related to techniques to indicate the higher order MCS data structure (e.g., table) from the network node, FIG. 3 represents the use of a separate flag (e.g., a bit in one or more implementations, although it is feasible to use multiple bits, e.g., to indicate one table among different higher order tables that may exist in future implementations). Once the decision logic 326 of the network device 104 decides to use higher order modulation, the decision logic 326 further has to indicate to the UE 102 that MCS index (in the DCI transmitted via PDCCH) corresponds to the new MCS table (rather than the previously configured MCS table). In this example implementation of FIG. 3, the network device 104 can indicate the change to the higher order MCS table as part of conventional downlink control channel (DCI)/PDCCH in which a separate bit has been allocated to indicate that it is using a different MCS table for the current transmission of PDSCH. Note that the higher layer signaling shown in FIG. 3, is where the network configures the UE with MCS table (64 QAM table).

From the reference signals, the UE computes the CSI, and, for example, consider that the UE reported 256 QAM using uplink feedback channel either for PUCCH (periodic reporting) or PUSCH (aperiodic reporting). If the network decides to use 256 QAM for PDSCH, then the network uses the downlink control channel to indicate that it is using the new MCS table (i.e. 256 QAM MCS table) for PDSCH. In this implementation, the network communicates this information as a separate bit field to indicate the updated MCS table, e.g., if the bit is set to one, the UE understand that the network uses updated MCS table, while if it is set to zero, the UE understands that the network uses the MCS table as configured during the higher layer signaling (RRC).

Another technique is to use an explicit indication as part of DCI with an unused combination of bits, that is, the network can inform the indication via an unused combination of an already existing field. For example, with a field of four bits, sixteen combinations are available, however for some given field, not all bits are used; e.g., if the standard defines only twelve combinations for a field, four combinations are unused. Thus, one otherwise unused combination is used to indicate the UE to change the MCS configuration to a different table from the RRC configuration table, while another otherwise unused combination can change the table back to the one configured via the RRC configuration. Note that this is an indication using an unused combination in which the other fields are not used for scheduling, e.g., there is a separate, simultaneous downlink control channel, as the UE can decode multiple control channels in the same time interval. An advantage of this technique is that there is no need to change the existing specification/standard, thereby reducing the standardization effort of drafting, testing etc.

Thus, in FIG. 4, the decision logic 426 of the network 104 is configured to indicate the change of the MCS table as part of a conventional downlink control channel (DCI), i.e. PDCCH. However, instead of using a separate bit, the decision logic 426 uses an unused combination of already existing field(s) for the indication. That is, for one set of unused combinations, the UE understand that the network uses the updated MCS table, and for another set of unused combinations, the UE understands that the network uses the MCS table as configured during the higher layer signaling (RRC).

In yet another technique generally exemplified in FIG. 5, the network can indicate the change of the MCS table as part of a separate downlink control channel (DCI), that is, a new PDCCH. The separate downlink control channel is used to indicate to the UE that the network is using a different MCS table for the current transmission of PDSCH. Note that this is in addition to the conventional downlink control channel, and is like a PDCCH order where the main purpose is to inform the UE about the network status; thus, in one or more implementations this separate control channel does not carry any scheduling information. Note that the higher layer signaling as shown in FIG. 5 is where the network configures the UE with MCS table (64 QAM table). From the reference signals, the UE computes the CSI; consider that the UE reported 256 QAM using the uplink feedback channel for either PUCCH (periodic reporting) or PUSCH (aperiodic reporting). Then, if the network decides to use 256 QAM for PDSCH, then the network uses the separate downlink control channel to indicate that it is using the updated MCS table (e.g., the 256 QAM MCS table) for PDSCH.

Figure 6:
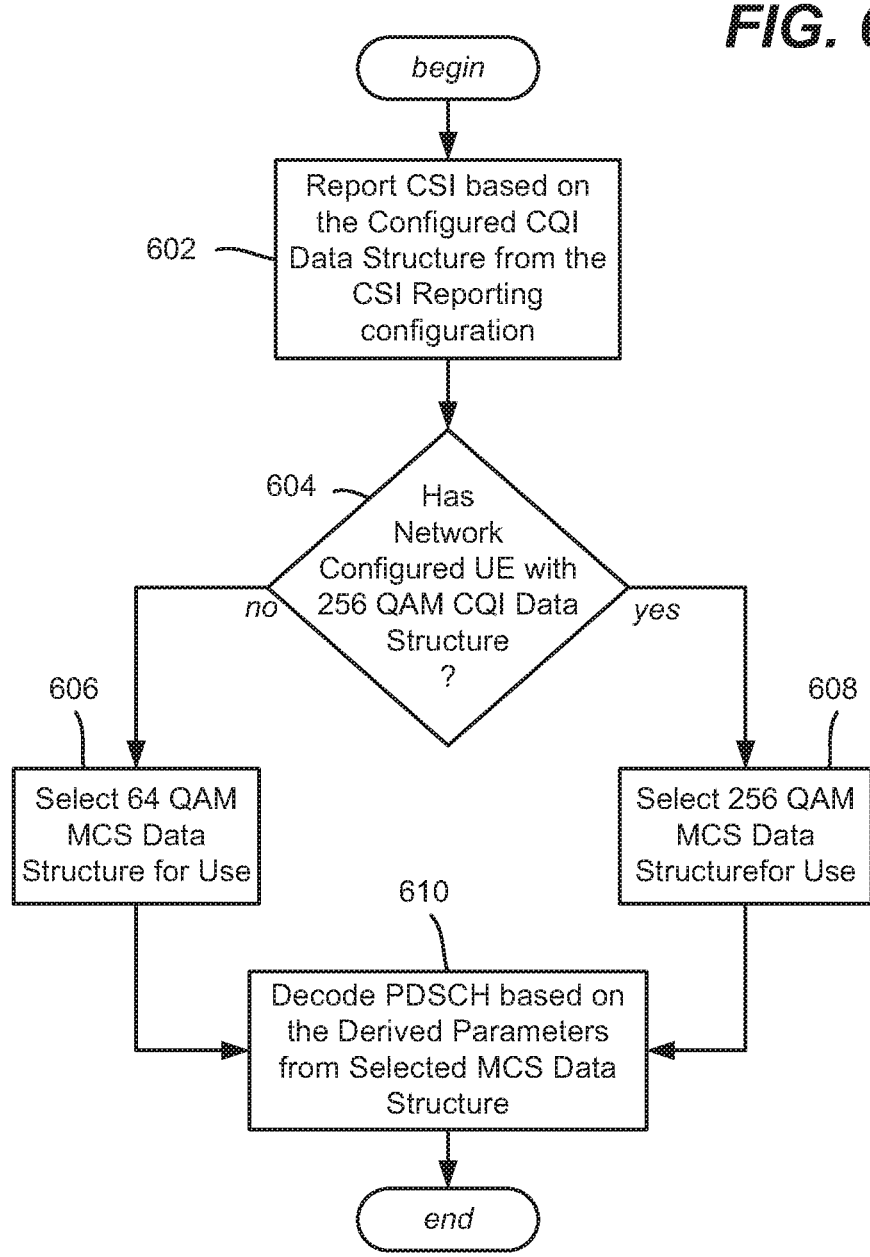
FIG. 6 illustrates an example flow diagram of operations for handling an implicit indication to use a higher (or lower) order modulation and coding scheme table, in accordance with various aspects and implementations of the subject disclosure.

FIG. 6 represents yet another technique that is based on an implicit indication. In general, instead of indicating a dynamic change explicitly, the network device 104 and the UE 102 have a prearranged understanding that, if the network configures the UE with the 256 QAM CQI table, then the network should use the MCS table with 256 QAM. Thus, when the UE decodes the DCI and interprets the MCS entries, the UE should use the 256 QAM MCS table (even though the higher layer signaling indicates 64 QAM MCS table).

By way of example, operation 602 of FIG. 6 represents reporting the CSI based on the configured CQI Data structure from the CSI reporting configuration. Operation 604 evaluates whether the network has configured the UE with the 256 QAM CQI data structure (table). If not, operation 606 selects the 64 QAM MCS data structure for use; if so, operation 608 selects the 256 QAM MCS data structure for use. Operation 610 represents decoding the PDSCH data based on the derived parameters from the selected MCS data structure.

Figure 7:
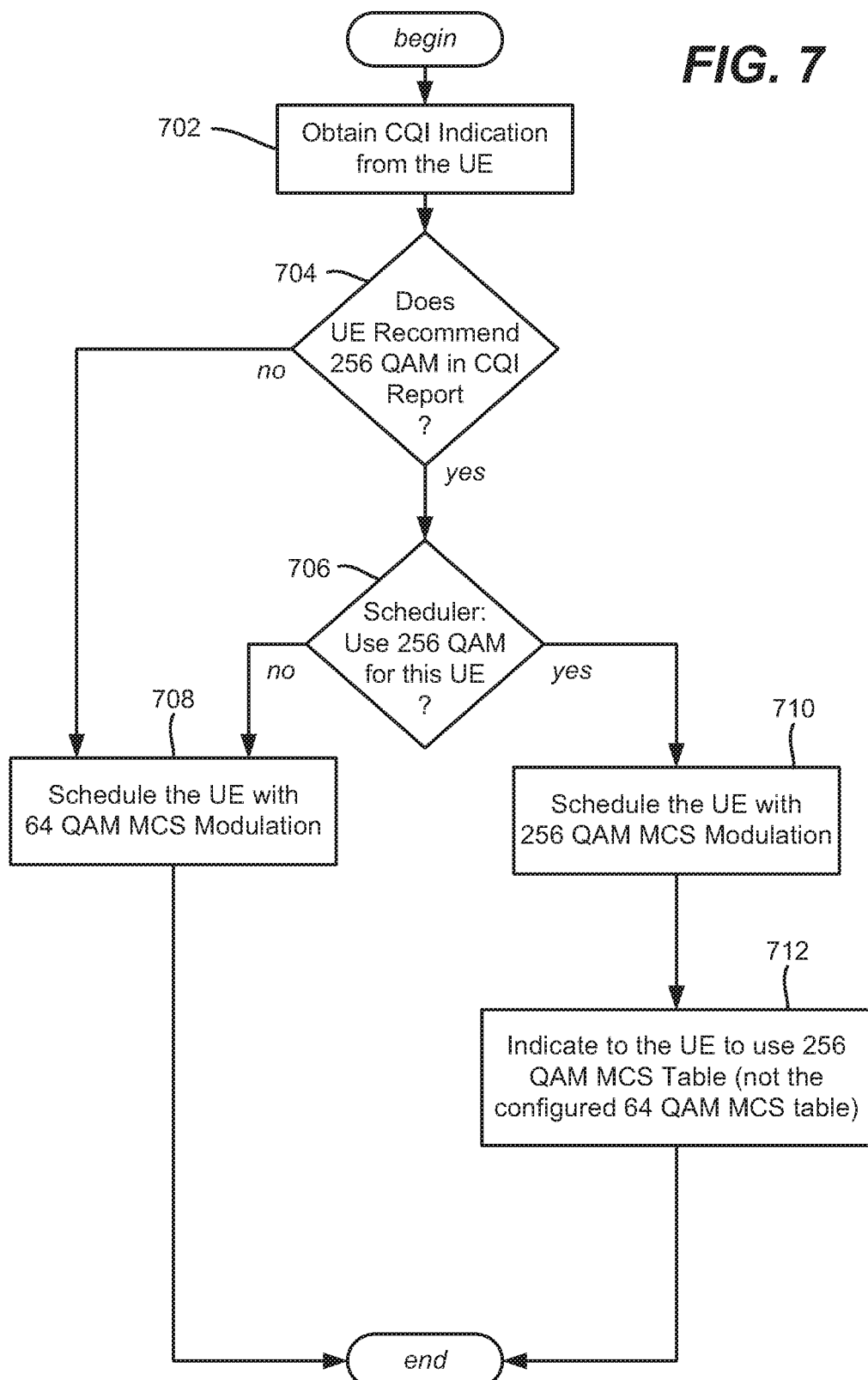
FIG. 7 illustrates an example flow diagram of network device operations for providing an indication from the network device to a user equipment to use a higher (or lower) order modulation and coding scheme table, in accordance with various aspects and implementations of the subject disclosure.

FIG. 7 represents general, example operations of a network device 104. Operation 702 represents obtaining the CQI data from the user equipment. Operation 704 represents evaluating whether the CQI Data recommends using 256 QAM. If not, 64 QAM MCS modulation is used (operation 708).

If at operation 704 the CQI Data recommends using 256 QAM, operation 706 is performed, when the scheduler decides whether or not to use 256 QAM for that particular user equipment. If not, 64 QAM MCS modulation is used (operation 708); if so, 256 QAM MCS modulation is used (operation 710). Operation 712 represents making the explicit or implicit indication to the user equipment to use the 256 QAM MCS table instead of the higher-layer signaling configured 64 QAM MCS table. Note that the user equipment instead may be configured to use 256 QAM MCS table, and the scheduler can choose an entry from 64 QAM table (as it has more resolution); thus the scheduler can choose 64 QAM at operation 706 regardless of the recommendation at operation 704.

Figure 8:
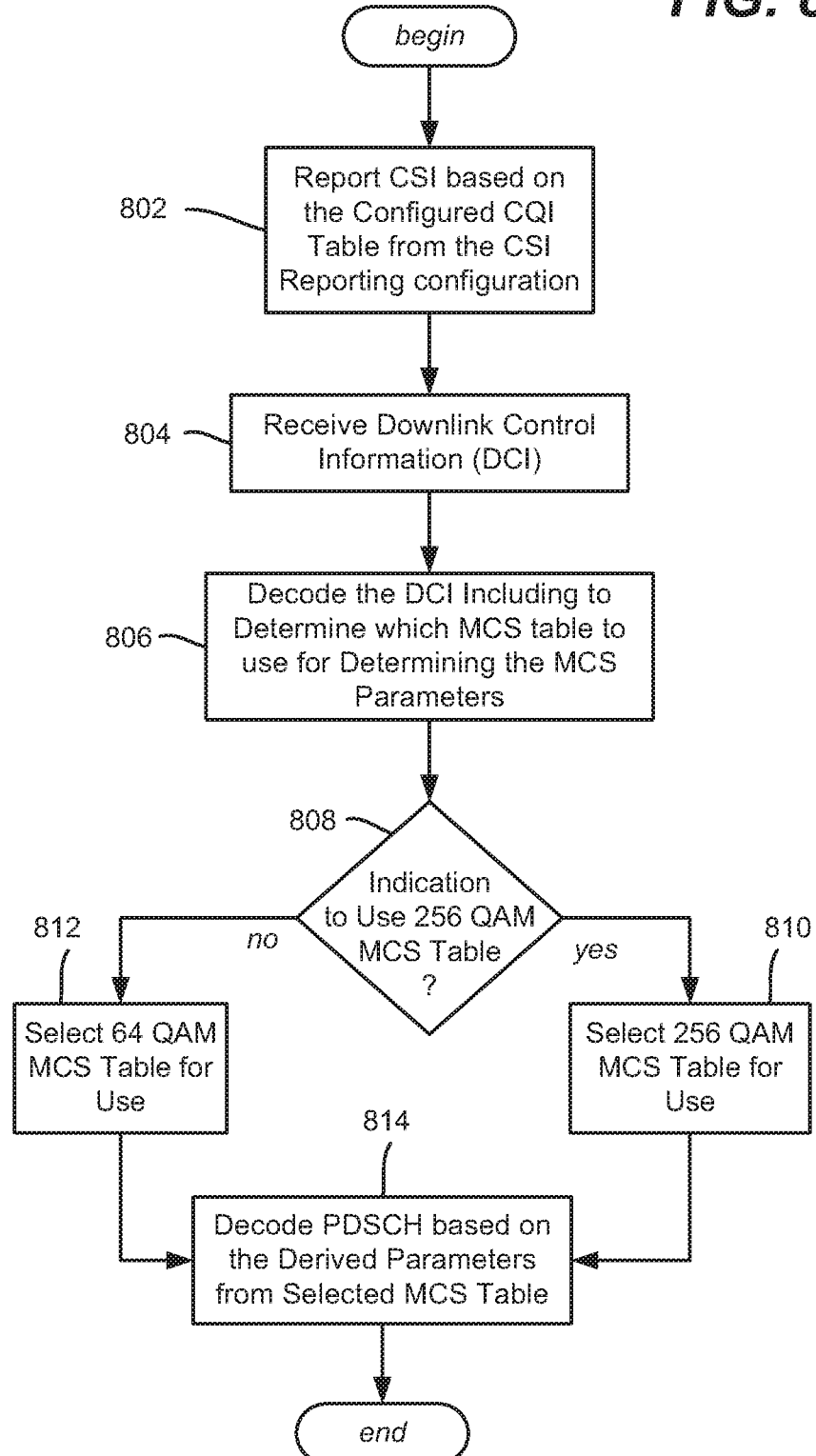
FIG. 8 illustrates an example flow diagram of user equipment operations for selecting a higher (or lower) order modulation and coding scheme table, in accordance with various aspects and implementations of the subject disclosure.

FIG. 8 represents general, example operations of a user equipment 102, generally in an explicit indication scenario. Operation 802 represents reporting the channel state information (CSI) based on the configured CQI table from the CSI reporting configuration. Operation 804 represents receiving the DCI, and operation 806 represents decoding the DCI to determine which MCS table to use for determining the MCS parameters.

If at operation 808 there is an indication to use the 256 QAM MCS table, the 256 QAM MCS table is selected for use (operation 810). Otherwise, the 64 QAM MCS table is selected for use (operation 812). Operation 814 represents the user equipment decoding the physical downlink shared channel (PDSCH) based on the derived parameters from the MCS table that was selected.

Figure 9:
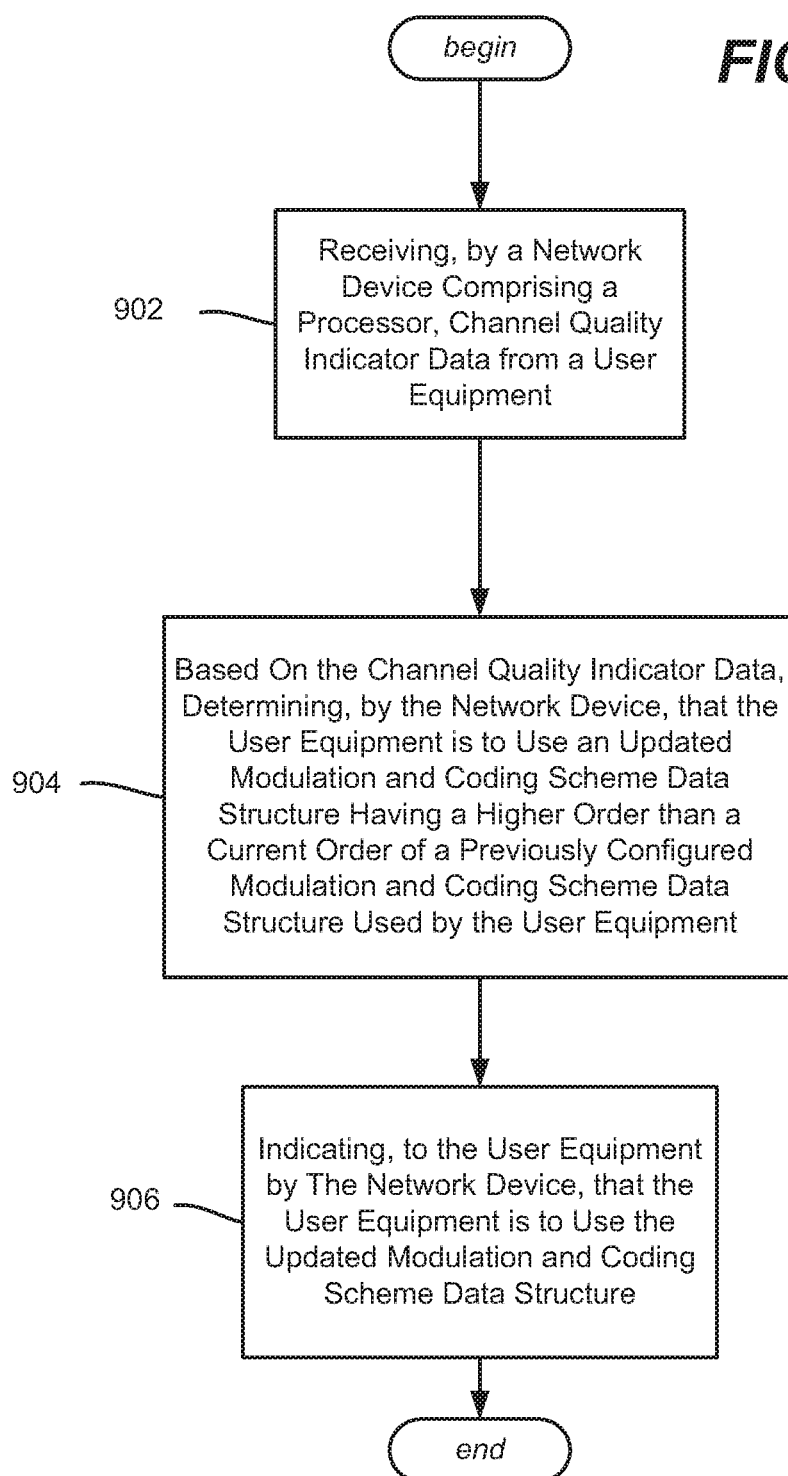
FIG. 9 illustrates an example flow diagram of network device operations for indicating from the network device to a user equipment to use a higher order modulation and coding scheme data structure, in accordance with various aspects and implementations of the subject disclosure.

One or more aspects, generally represented in FIG. 9, represent example operations comprising (operation 902) receiving, by a network device comprising a processor, channel quality indicator data from a user equipment. Based on the channel quality indicator data, operation 904 represents determining, by the network device, that the user equipment is to use an updated modulation and coding scheme data structure having a higher order than a current order of a previously configured modulation and coding scheme data structure used by the user equipment. Operation 906 represents indicating, to the user equipment by the network device, that the user equipment is to use the updated modulation and coding scheme data structure.

Indicating to the user equipment that the user equipment is to use the updated modulation and coding scheme data structure can comprise communicating explicit indication data via a flag value. Indicating to the user equipment that the user equipment is to use the updated modulation and coding scheme data structure can comprise communicating explicit indication data via an otherwise unused bit combination in a field of downlink control channel information. Indicating to the user equipment that the user equipment is to use the updated modulation and coding scheme data structure can comprise comprises communicating explicit indication data via a second downlink control channel that is separate from a first downlink control channel that carries scheduling information. Indicating to the user equipment that the user equipment is to use the updated modulation and coding scheme data structure can comprise communicating implicit indication data that is based on the network device configuring the user equipment with a higher order channel quality indicator data structure.

Indicating to the user equipment that the user equipment is to use the updated modulation and coding scheme data structure can comprise indicating to the user equipment to change to a 256 quadrature amplitude modulation and coding scheme table for a current physical downlink shared channel transmission from a 64 quadrature amplitude modulation and coding scheme table as the previously configured data structure.

Determining by the network device that the user equipment is to use the updated modulation and coding scheme data structure can comprise detecting that the user equipment has recommended using 256 quadrature amplitude modulation in the channel quality indicator data, and that a scheduler of the network device decides to use 256 QAM for the user equipment.

Aspects can comprise communicating, by the network device to the user equipment, a demand for an aperiodic channel status information report; receiving the channel quality indicator data from the user equipment can occur in response to the demand for the aperiodic channel status information report.

Aspects can comprise indicating, in another indication to the user equipment, that the user equipment is to return to using the previously configured modulation and coding scheme data structure.

Figure 10:
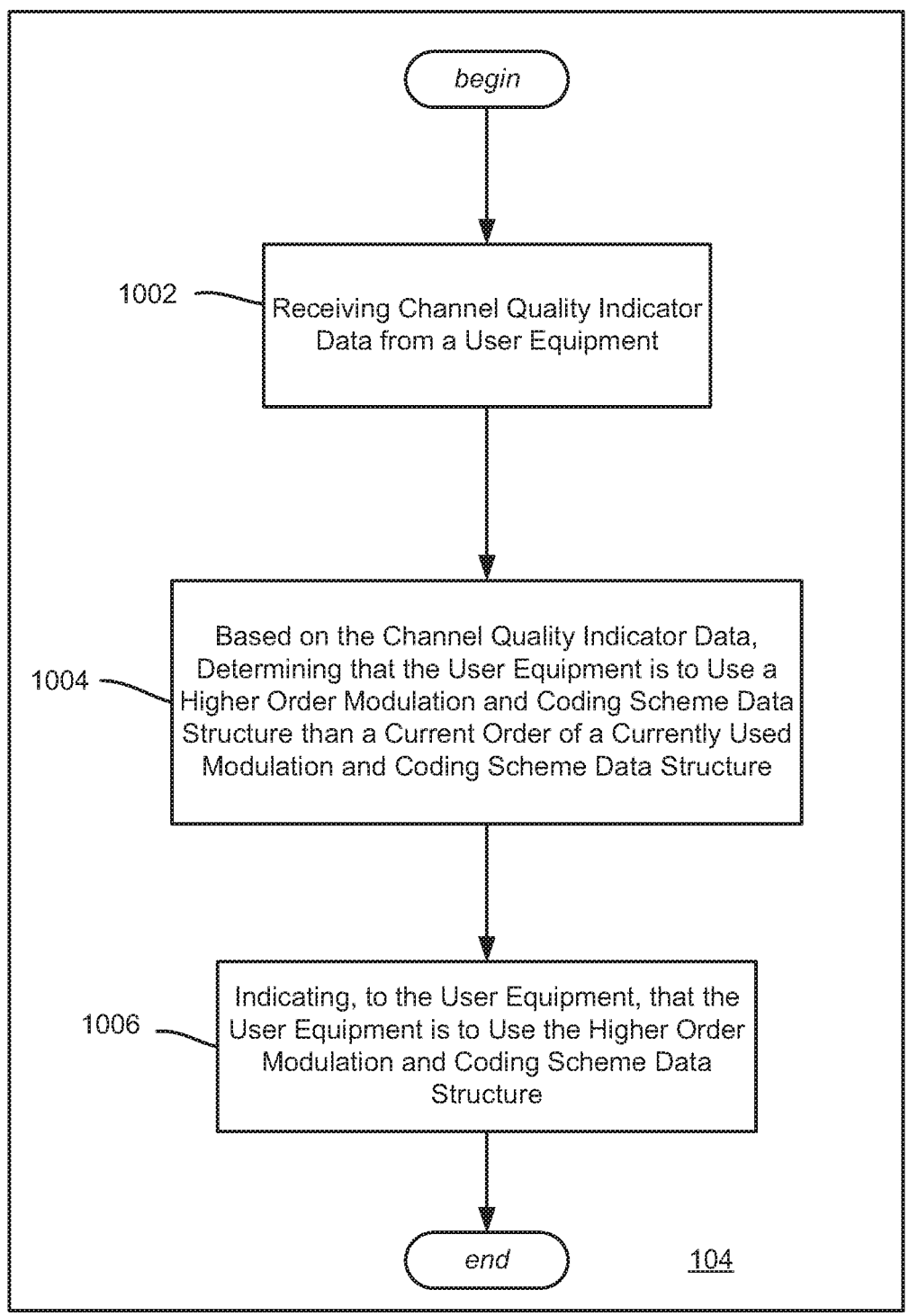
FIG. 10 illustrates a block diagram of a network device's example operations, comprising operations for indicating from the network device to a user equipment to use a higher order modulation and coding scheme data structure, in accordance with various aspects and implementations of the subject disclosure.

An example embodiment of a network device 104 comprising a processor and a memory that stores executable instructions that, when executed by the processor, facilitate performance of operations, is represented in FIG. 10. The operations can comprise receiving channel quality indicator data from a user equipment (operation 1002), and based on the channel quality indicator data, determining (operation 1004) that the user equipment is to use a higher order modulation and coding scheme data structure than a current order of a currently used modulation and coding scheme data structure. Operation 1006 represents indicating, to the user equipment, that the user equipment is to use the higher order modulation and coding scheme data structure.

Indicating that the user equipment is to use the higher order modulation and coding scheme data structure can comprise communicating explicit indication data via a flag value. Indicating that the user equipment is to use the higher order modulation and coding scheme data structure can comprise communicating explicit indication data datum via an otherwise unused bit combination in a field of a separate downlink control channel. Indicating that the user equipment is to use the higher order modulation and coding scheme data structure can comprise communicating explicit indication data via a second downlink control channel that is separate from a first downlink control channel that carries scheduling information.

Example operations can further comprise determining a higher order channel quality indicator data structure for the user equipment, in which the determining the higher order channel quality indicator data structure is based on the channel quality indicator data, and communicating configuration information to configure the user equipment to use the higher order channel quality indicator data structure, wherein the indicating, to the user equipment, that the user equipment is to use the higher order modulation and coding scheme data structure is implicitly indicated to the user equipment based on the configuration information to use a higher order channel quality indicator data structure.

Determining that the user equipment is to use the higher order modulation and coding scheme data structure can comprise detecting that the user equipment has recommended using 256 quadrature amplitude modulation in the channel quality indicator data, and that a scheduler of the network device decides to use 256 quadrature amplitude modulation for the user equipment.

Figure 11:
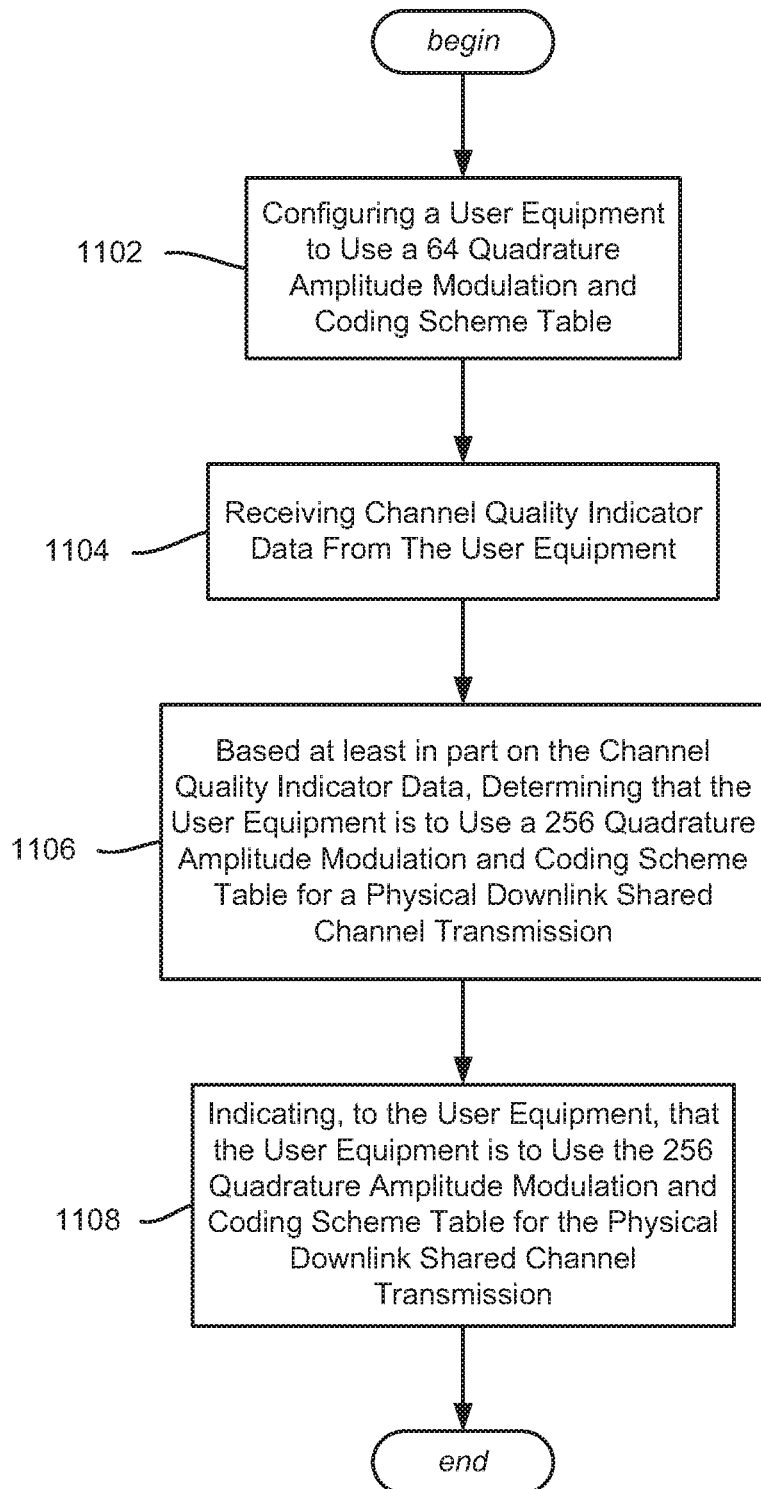
FIG. 11 illustrates an example flow diagram of network device operations for indicating from the network device to a user equipment to use a higher order modulation and coding scheme table instead of a previously configured table, in accordance with various aspects and implementations of the subject disclosure.

FIG. 11 represents example operations, such as of a machine-readable storage medium, comprising executable instructions that, when executed by a processor of a network device, facilitate performance of operations. The operations can comprise configuring a user equipment to use a 64 quadrature amplitude modulation and coding scheme table (operation 1102). Operation 1104 represents receiving channel quality indicator data from the user equipment. Operation 1106 represents, based at least in part on the channel quality indicator data, determining that the user equipment is to use a 256 quadrature amplitude modulation and coding scheme table for a physical downlink shared channel transmission. Operation 1108 represents indicating, to the user equipment, that the user equipment is to use the 256 quadrature amplitude modulation and coding scheme table for the physical downlink shared channel transmission.

Indicating that the user equipment is to use the 256 quadrature amplitude modulation and coding scheme table can comprise communicating explicit indication data via a flag value. Indicating that the user equipment is to use the 256 quadrature amplitude modulation and coding scheme table can comprise communicating explicit indication data via an otherwise unused bit combination in a field of downlink control channel information. Indicating that the user equipment is to use the 256 quadrature amplitude modulation and coding scheme table can comprise communicating explicit indication data via a second downlink control channel that is separate from a first downlink control channel that carries scheduling information.

Further operations can comprise, based on the channel quality indicator data, determining a 256 quadrature amplitude modulation channel quality indicator table for the user equipment, and communicating configuration information to configure the user equipment to use the 256 quadrature amplitude modulation channel quality indicator table, wherein the indicating, to the user equipment, that the user equipment is to use the 256 quadrature amplitude modulation and coding scheme table comprised implicitly indicating to the user equipment based on the configuration information to use the 256 quadrature amplitude modulation channel quality indicator table.

Figure 12:
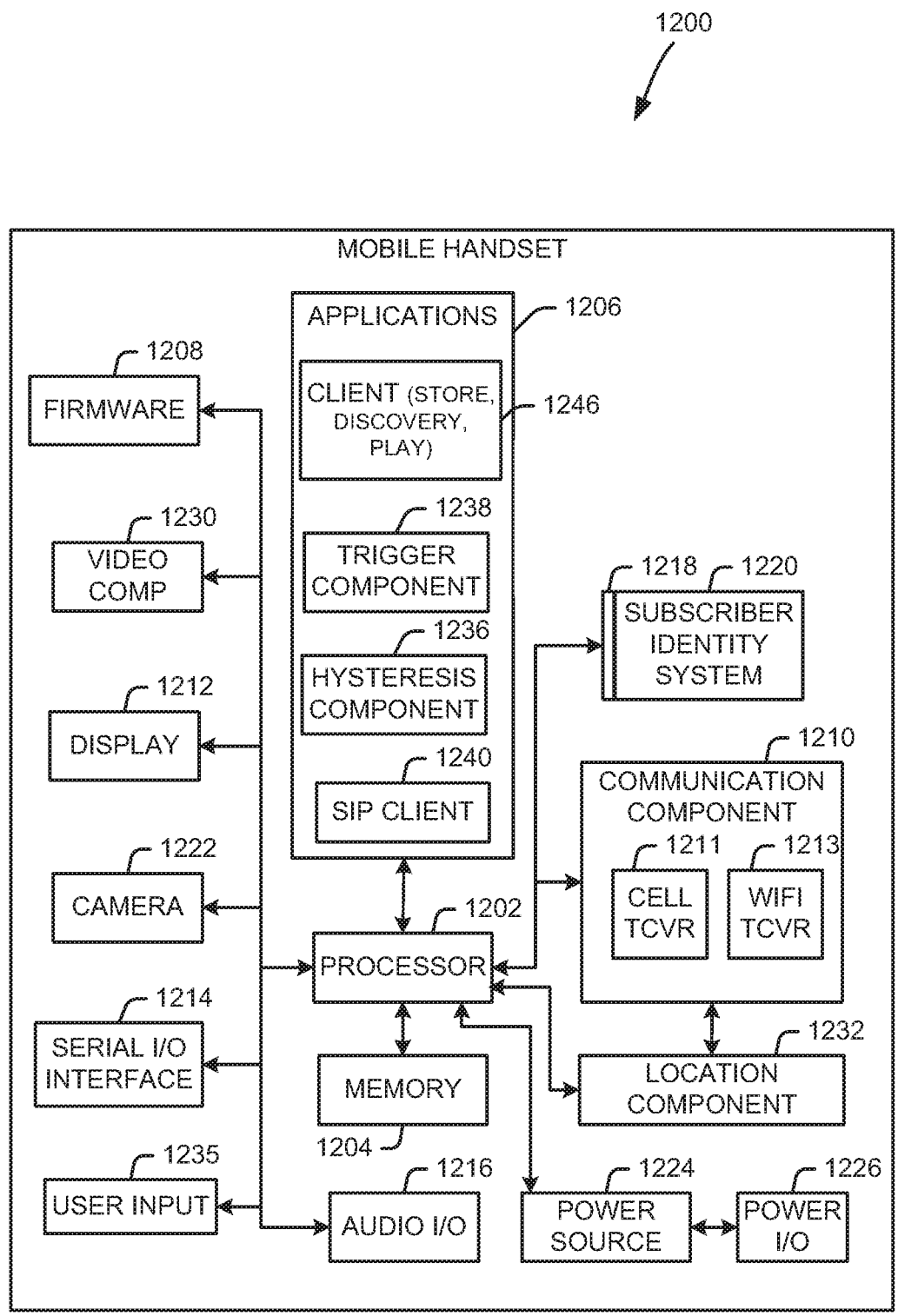
FIG. 12 illustrates an example block diagram of an example mobile handset operable to engage in a system architecture that facilitates wireless communications according to one or more embodiments described herein.

Referring now to FIG. 12, illustrated is an example block diagram of an example mobile handset 1200 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1294) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communications component 1210 to accommodate IP traffic from an IP network such as, for example, the Internet, a corporate intranet, a home network, a person area network, etc., through an ISP or broadband cable provider. Thus, VoIP traffic can be utilized by the handset 1200 and IP-based multimedia content can be received in either an encoded or a decoded format.

A video processing component 1222 (e.g., a camera) can be provided for decoding encoded multimedia content. The video processing component 1222 can aid in facilitating the generation, editing, and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1236 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 1210, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
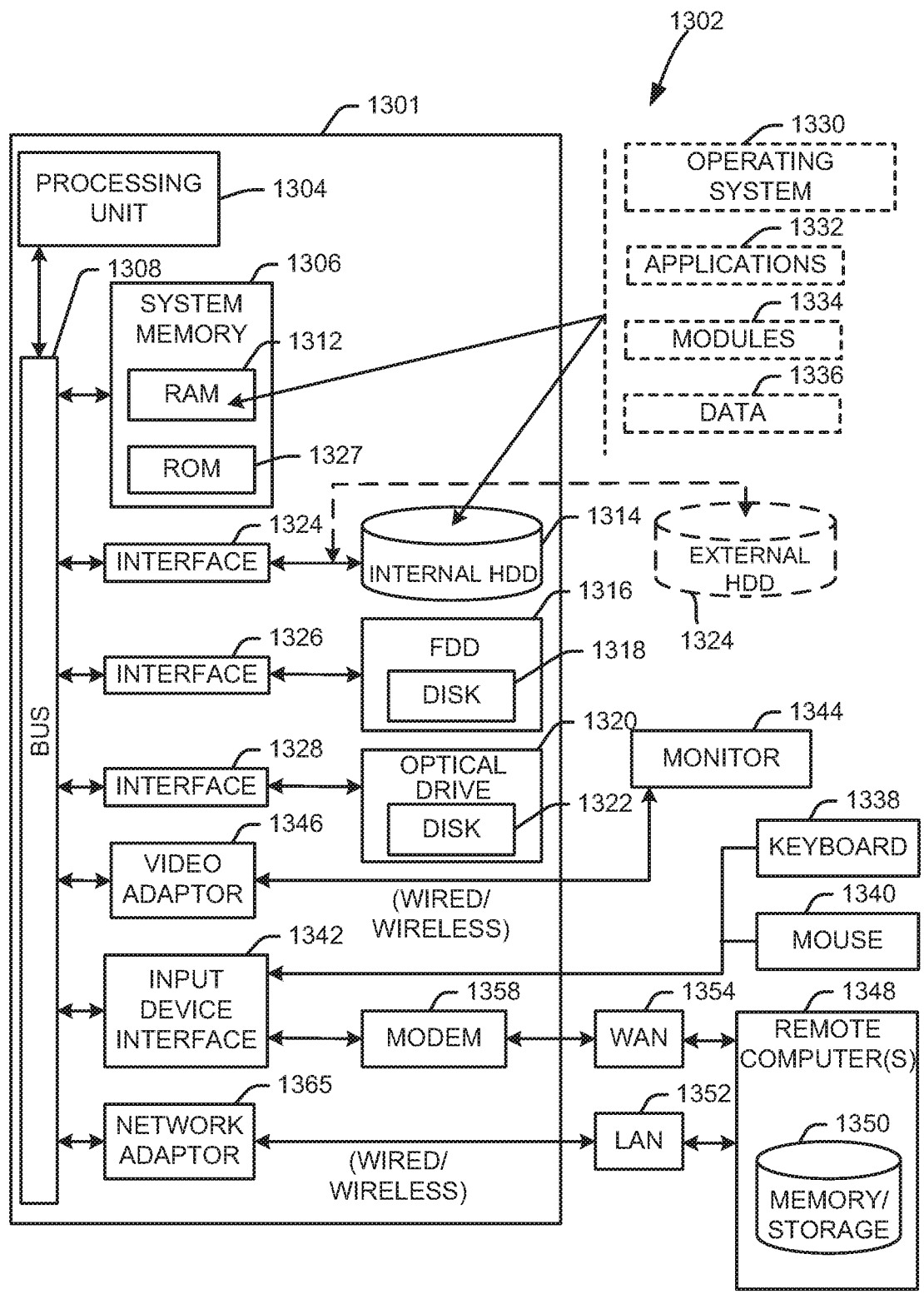
FIG. 13 illustrates an example block diagram of an example computer operable to engage in a system architec-

Referring now to FIG. 13, illustrated is an example block diagram of an example computer 1300 operable to engage in a system architecture that facilitates wireless communications according to one or more embodiments described herein. The computer 1300 can provide networking and communication capabilities between a wired or wireless communication network and a server (e.g., Microsoft server) and/or communication device. In order to provide additional context for various aspects thereof, FIG. 13 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 13 is but one example of a computing device.

In order to provide a context for the various aspects of the disclosed subject matter, FIG. 13 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1320 (see below), non-volatile memory 1322 (see below), disk storage 1324 (see below), and memory storage 1346 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 13 illustrates a block diagram of a computing system 1300 operable to execute the disclosed systems and methods in accordance with an embodiment. Computer 1312, which can be, for example, part of the hardware of system 1320, includes a processing unit 1314, a system memory 1316, and a system bus 1318. System bus 1318 couples system components including, but not limited to, system memory 1316 to processing unit 1314. Processing unit 1314 can be any of various available processors. Dual microprocessors and other multiprocessor architectures also can be employed as processing unit 1314.

System bus 1318 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1394), and Small Computer Systems Interface (SCSI).

System memory 1316 can include volatile memory 1320 and nonvolatile memory 1322. A basic input/output system (BIOS), containing routines to transfer information between elements within computer 1312, such as during start-up, can be stored in nonvolatile memory 1322. By way of illustration, and not limitation, nonvolatile memory 1322 can include ROM, PROM, EPROM, EEPROM, or flash memory. Volatile memory 1320 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 can also include removable/non-removable, volatile/non-volatile computer storage media. FIG. 13 illustrates, for example, disk storage 1324. Disk storage 1324 includes, but is not limited to, devices like a magnetic disk drive, floppy disk drive, tape drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to system bus 1318, a removable or non-removable interface is typically used, such as interface 1326.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 13 describes software that acts as an intermediary between users and computer resources described in suitable operating environment 1300. Such software includes an operating system 1328. Operating system 1328, which can be stored on disk storage 1324, acts to control and allocate resources of computer system 1312. System applications 1330 take advantage of the management of resources by operating system 1328 through program modules 1332 and program data 1334 stored either in system memory 1316 or on disk storage 1324. It is to be noted that the disclosed subject matter can be implemented with various operating systems or combinations of operating systems.

A user can enter commands or information into computer 1312 through input device(s) 1336. As an example, a mobile device and/or portable device can include a user interface embodied in a touch sensitive display panel allowing a user to interact with computer 1312. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1314 through system bus 1318 by way of interface port(s) 1338. Interface port(s) 1338 include, for example, a serial port, a parallel port, a game port, a universal serial bus (USB), an infrared port, a Bluetooth port, an IP port, or a logical port associated with a wireless service, etc. Output device(s) 1340 and a move use some of the same type of ports as input device(s) 1336.

Thus, for example, a USB port can be used to provide input to computer 1312 and to output information from computer 1312 to an output device 1340. Output adapter 1342 is provided to illustrate that there are some output devices 1340 like monitors, speakers, and printers, among other output devices 1340, which use special adapters. Output adapters 1342 include, by way of illustration and not limitation, video and sound cards that provide means of connection between output device 1340 and system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. Remote computer(s) 1344 can be a personal computer, a server, a router, a network PC, cloud storage, cloud service, a workstation, a microprocessor based appliance, a peer device, or other common network node and the like, and typically includes many or all of the elements described relative to computer 1312.

For purposes of brevity, only a memory storage device 1346 is illustrated with remote computer(s) 1344. Remote computer(s) 1344 is logically connected to computer 1312 through a network interface 1348 and then physically connected by way of communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1350 refer(s) to hardware/software employed to connect network interface 1348 to bus 1318. While communication connection 1350 is shown for illustrative clarity inside computer 1312, it can also be external to computer 1312. The hardware/software for connection to network interface 1348 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
receiving, by a network device comprising a processor, channel quality indicator data from a user equipment;
based on the channel quality indicator data, determining, by the network device, that the user equipment is to use an updated modulation and coding scheme data structure having a higher order than a current order of a previously configured modulation and coding scheme data structure used by the user equipment; and
indicating, to the user equipment by the network device via a second downlink control channel that is separate from a first downlink control channel that carries scheduling information to the user equipment, that the user equipment is to use the updated modulation and coding scheme data structure, wherein the second downlink control channel does not carry any scheduling information to the user equipment.

2. The method of claim 1, further comprising configuring, by the network device, the user equipment to use an updated quadrature amplitude modulation channel quality indicator table having the higher order.

3. The method of claim 1, wherein the updated modulation and coding scheme data structure is a 256 quadrature amplitude modulation and coding scheme table.

4. The method of claim 2, wherein the updated quadrature amplitude modulation channel quality indicator table is a 256 quadrature amplitude modulation channel quality indicator table.

5. The method of claim 1, wherein the updated modulation and coding scheme data structure is a 512 quadrature amplitude modulation and coding scheme table.

6. The method of claim 1, wherein the previously configured modulation and coding scheme data structure is a 64 quadrature amplitude modulation and coding scheme table.

7. The method of claim 1, wherein the determining, by the network device, that the user equipment is to use the updated modulation and coding scheme data structure comprises detecting that the user equipment has recommended using 256 quadrature amplitude modulation in the channel quality indicator data, and a scheduler of the network device decides to use the 256 quadrature amplitude modulation for the user equipment, or wherein the determining, by the network device, that the user equipment is to use the updated modulation and coding scheme data structure comprises detecting that the user equipment has recommended using 256 quadrature amplitude modulation in the channel quality indicator data, and a scheduler of the network device decides to use a 64 quadrature amplitude modulation for the user equipment.

8. The method of claim 1, further comprising, communicating, by the network device to the user equipment, a demand for an aperiodic channel status information report, and wherein the receiving the channel quality indicator data from the user equipment occurs in response to the demand for the aperiodic channel status information report.

9. The method of claim 1, further comprising, indicating, in another indication to the user equipment, that the user equipment is to return to using the previously configured modulation and coding scheme data structure.

10. A network device, comprising:
a processor; and
a memory that stores executable instructions that, when executed by the processor, facilitate performance of operations, the operations comprising:
receiving channel quality indicator data from a user equipment;
based on the channel quality indicator data, determining that the user equipment is to use a higher order modulation and coding scheme data structure than a current order of a currently used modulation and coding scheme data structure; and
indicating, to the user equipment via a second downlink control channel that is separate from a first downlink control channel that carries scheduling information to the user equipment, that the user equipment is to use the higher order modulation and coding scheme data structure, wherein the second downlink control channel does not carry any scheduling information to the user equipment.

11. The network device of claim 10, wherein the operations further comprising configuring, by the network device, the user equipment to use a higher order quadrature amplitude modulation channel quality indicator table.

12. The network device of claim 10, wherein the higher order modulation and coding scheme data structure is a 256 quadrature amplitude modulation and coding scheme table.

13. The network device of claim 11, wherein the higher order quadrature amplitude modulation channel quality indicator table is a 256 quadrature amplitude modulation channel quality indicator table.

14. The network device of claim 10, wherein the higher order modulation and coding scheme data structure is a 512 quadrature amplitude modulation and coding scheme table.

15. The network device of claim 10, wherein the determining, by the network device, that the user equipment is to use the higher order modulation and coding scheme data structure comprises detecting that the user equipment has recommended using 256 quadrature amplitude modulation in the channel quality indicator data, and that a scheduler of the network device decides to use the 256 quadrature amplitude modulation for the user equipment.

16. A non-transitory machine-readable storage medium, comprising executable instructions that, when executed by a processor of a network device, facilitate performance of operations, the operations comprising:
configuring a user equipment to use a low order quadrature amplitude modulation and coding scheme table that is of a lower order than a high order quadrature amplitude modulation and coding scheme table;
receiving channel quality indicator data from the user equipment;
based at least in part on the channel quality indicator data, determining that the user equipment is to use the high order quadrature amplitude modulation and coding scheme table for a physical downlink shared channel transmission; and
indicating, to the user equipment via a second downlink control channel that is separate from a first downlink control channel that carries scheduling information to the user equipment, that the user equipment is to use the high order quadrature amplitude modulation and coding scheme table for the physical downlink shared channel transmission, wherein the second downlink control channel does not carry any scheduling information to the user equipment.

17. The non-transitory machine-readable storage medium of claim 16, wherein the operations further comprise configuring the user equipment to employ a high order quadrature amplitude modulation and coding scheme table that is a 256 quadrature amplitude modulation and coding scheme table.

18. The non-transitory machine-readable storage medium of claim 16, wherein the higher order quadrature amplitude modulation channel quality indicator table is a 256 quadrature amplitude modulation channel quality indicator table.

19. The non-transitory machine-readable storage medium of claim 16, wherein the high order quadrature amplitude modulation and coding scheme table is a 512 quadrature amplitude modulation and coding scheme table.

20. The non-transitory machine-readable storage medium of claim 16, wherein the low order quadrature amplitude modulation and coding scheme table is a 64 quadrature amplitude modulation and coding scheme table.

* * * * *